US011821705B1

(12) United States Patent
Smith et al.

(10) Patent No.: US 11,821,705 B1
(45) Date of Patent: Nov. 21, 2023

(54) FULL POWER BLOW-BACK GUN WITH CRASH SAFETY FOR LIGHTWEIGHT APPLICATION

(71) Applicant: U.S. Gov. as Rep. by the Secretary of the Army, Picatinny Arsenal, NJ (US)

(72) Inventors: Alex Smith, Long Valley, NJ (US); Tim Brosseau, Havre De Grace, MD (US); Alex Michlin, Whiteford, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/813,172

(22) Filed: Jul. 18, 2022

Related U.S. Application Data

(63) Continuation of application No. 17/191,067, filed on Mar. 3, 2021, now Pat. No. 11,466,946.

(60) Provisional application No. 62/985,380, filed on Mar. 5, 2020.

(51) Int. Cl.
| | |
|---|---|
| *F41A 7/08* | (2006.01) |
| *F41A 23/02* | (2006.01) |
| *F41A 9/51* | (2006.01) |
| *F41A 19/31* | (2006.01) |
| *F41A 19/12* | (2006.01) |
| *B64C 39/02* | (2023.01) |
| *B64U 101/00* | (2023.01) |

(52) U.S. Cl.
CPC .................. *F41A 7/08* (2013.01); *F41A 9/51* (2013.01); *F41A 19/12* (2013.01); *F41A 19/31* (2013.01); *F41A 23/02* (2013.01); *B64C 39/024* (2013.01); *B64U 2101/00* (2023.01)

(58) Field of Classification Search
USPC .............................................. 89/4.5, 9, 27.14
See application file for complete search history.

(56) References Cited

U.S. PATENT DOCUMENTS

| | | | | |
|---|---|---|---|---|
| 1,183,492 | A * | 5/1916 | Pratt .......................... | F41C 9/00 |
| | | | | 42/69.03 |
| 5,419,234 | A * | 5/1995 | Sanderson ............... | B64D 7/00 |
| | | | | 89/33.16 |
| 5,767,436 | A * | 6/1998 | Sanderson .............. | F41A 21/36 |
| | | | | 89/37.16 |
| 7,836,811 | B1 * | 11/2010 | Gardner .................. | F41A 27/24 |
| | | | | 180/9.1 |
| 7,841,279 | B2 | 11/2010 | Reynolds | |

(Continued)

*Primary Examiner* — Bret Hayes
(74) *Attorney, Agent, or Firm* — John P. DiScala (57) ABSTRACT

A small lightweight weapon system for integration into an unmanned aerial vehicle comprises a weapon operating group which utilizes blowback operation to fire a full-powered centerfire rifle ammunition. An operating rod of the weapon operating group has an axis of translation offset from the longitudinal axis of the barrel thereby creating a moment couple on the system. A motor assembly controls the operation of the weapon operating group. Through a gear train, actuation of the motor assembly lifts a sear against a return torsion spring, which holds the operating group back when not firing. The gear train comprises a one way flywheel disconnect to increase the torque of the direct current motor and overcome the force of the torsion spring. Intelligent motor commutation and burst control are achieved through an encoder and software package.

8 Claims, 11 Drawing Sheets

(56) References Cited

U.S. PATENT DOCUMENTS

| | | | | |
|---|---|---|---|---|
| 9,062,927 | B1* | 6/2015 | Tepaske | F41A 7/08 |
| 10,352,638 | B1* | 7/2019 | Day | F41A 9/50 |
| 11,466,946 | B1* | 10/2022 | Smith | F41A 23/02 |
| 2010/0175547 | A1* | 7/2010 | Hoffman | F41A 9/24 |
| | | | | 89/9 |
| 2011/0265639 | A1* | 11/2011 | Darian | F41A 21/484 |
| | | | | 42/16 |
| 2014/0116237 | A1* | 5/2014 | Hagedorn | F41A 27/30 |
| | | | | 89/37.03 |
| 2015/0059567 | A1* | 3/2015 | Fox | F41G 3/10 |
| | | | | 89/41.19 |
| 2018/0023912 | A1* | 1/2018 | Cudazzo | F41A 17/72 |
| | | | | 89/136 |

* cited by examiner

FULL POWER BLOW-BACK GUN WITH CRASH SAFETY FOR LIGHTWEIGHT APPLICATION

CROSS-REFERENCE TO RELATED APPLICATIONS

This application is a continuation of U.S. patent application Ser. No. 17/191,067 filed Mar. 3, 2020 which claims the benefit under 35 USC § 119(e) of U.S. provisional patent application 62/985,380 filed on Mar. 3, 2020.

STATEMENT OF GOVERNMENT INTEREST

The inventions described herein may be manufactured, used and licensed by or for the United States Government.

FIELD OF THE INVENTION

The invention relates in general to remotely-operated weapons and in particular to remotely operated weapons for lightweight platforms.

BACKGOUND OF THE INVENTION

Small arms technology is advancing into new fields as remote or semi-autonomous platforms are being introduced onto the battlefield. Large Unmanned Aerial Systems (UAS) such as the Predator or Reaper drones already provide the military and intelligence services with remote lethality from the air. Smaller soldier-portable platforms afford soldiers greater visibility or situational awareness. However, these systems are currently limited in their ability to enable lethality due to the difficulties of integrating a weapon system in such systems.

A small UAS is severely limited on its mission time by battery life and payload. Every additional ounce that is not afforded to batteries is a major drain on flight time. This has impeded the small UAS role as a weapon platform. Any armament mounted to such a drone must be extremely lightweight in addition to having the traditional requirements of being accurate, reliable and lethal at the prescribed ranges.

In addition, weapon systems must meet additional requirements for use on an aerial platform which are not applicable for ground based platforms. If a drone were to make a crash landing, it is imperative that a cocked weapon not fire, thereby possibly discharging into an unintended individual.

A need exists for a lightweight weapon system which may be integrated on a soldier-portable UAV to enable accurate and reliable lethality.

SUMMARY OF INVENTION

One aspect of the invention is a remote weapon system for use on a vehicle. The weapon system comprises a receiver structure for mounting the weapon system to the vehicle, an ammunition magazine positioned on top of the receiver structure, a barrel inserted into the receiver structure and further comprising a longitudinal axis, a blowback operated weapon operating group utilizing housed within the receiver and a motor assembly mounted to the receiver structure for controlling the operation of the operating group. The weapon operating group further comprises a bolt, a first operating rod and a second operating rod, a driver spring and a sear. The first operating group and the second operating group further comprise an axis of translation which is offset from the longitudinal axis of the barrel thereby creating a moment couple on the system. The first operating and the second operating rod pull the bolt against a drive spring by translating through corresponding holes in the receiver structure. The sear controllably restrains the bolt against the drive spring.

One aspect of the invention is a remote weapon system for use on a vehicle. The weapon system comprises a receiver structure for mounting the weapon system to the vehicle, an ammunition magazine positioned on top of the receiver structure, a barrel inserted into the receiver structure and further comprising a longitudinal axis, a blowback operated weapon operating group utilizing housed within the receiver and a motor assembly mounted to the receiver structure for controlling the operation of the operating group. The receiver structure further comprises a polymer buffer for arresting movement of a rearward travelling bolt for a period of time. The weapon operating group further comprises a bolt, a first operating rod and a second operating rod, a driver spring and a sear. The bolt further comprises a fixed firing pin configured to contact a chambered ammunition round while the bolt is translating forward thereby causing a portion of energy resulting from cartridge impulse to be employed halting the forward translation of the bolt. The first operating group and the second operating group further comprise an axis of translation which is offset from the longitudinal axis of the barrel thereby creating a moment couple on the system. The first operating and the second operating rod pull the bolt against a drive spring by translating through corresponding holes in the receiver structure. The sear controllably restrains the bolt against the drive spring.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

A weapon system for use on a lightweight unmanned aerial vehicle (UAV) employs blowback operation to provide lightweight and reliable lethality. The weapon system enables firing of high power centerfire rifle cartridges from the lightweight UAV without the need for an overly massive bolt. The weapon system achieves this through several design features which will be described in more detail below. Additionally, the weapon system is configured such that it will not fire due to a crash landing.

The weapon system is particularly suited for use on a lightweight UAV. In this context, lightweight UAV denotes a UAV which is soldier-portable. For example, the weapon system is particularly suited for Group 1 and Group 2 UAVs as classified by the United States Department of Defense. Group 1 UAVs are classified as UAVs which weigh between 0 and 20 pounds and have an operating altitude of less than 1200 feet above ground level (AGL). Group 2 UAVs are generally classified as being between 21 and 55 pounds and have an operating altitude less than 3500 feet AGL. While the weapon system is particularly suited to Group 1 and Group 2 UAVs, the weapon system is not limited to use on Group 1 and Group 2 UAVs. The weapon system may be integrated on larger UAVs if desired.

Those skilled in the art will recognize that the weapon system is not limited to use on UAV as the light weight and reliability of the weapon system may be advantageous when integrated on other unmanned vehicles, such as unmanned ground vehicle. More broadly, the weapon system may be integrated on any vehicle which travels under, above or on the ground through any medium, including air, water and space.

The weapon system is described as being configured for firing high powered centerfire rifle cartridges. In this context, high powered means ammunition with chamber pressures in excess of 50 kpsia such as 5.7×28 mm or .223 caliber. Rifle cartridge may denote a cartridge of the size typically employed by rifles such as FNP90, AR-15, or Mini-14 types. While the weapon system is described as firing high powered centerfire rifle cartridges, it is not limited to firing high powered centerfire rifle cartridges. The weapon system may be configured to fire lower pressure, lower impulse pistol cartridges such as 9 mm or .45.

Advantageously, the weapon system achieves successful blowback operation of a high powered cartridge without the need for a massive bolt. As will be described in further detail below, this is achieved through several design features. First, the weapon operating group creates a torqueing action on the weapon system during firing. This both introduces a gyroscopic effect and increases the friction between moving parts of the operating group. Secondly, components which normally contribute parasitic mass in other weapon systems actually reciprocate with the action in the weapon system. This further slows down the bolt after firing. Advanced primer ignition ensures that the primer is ignited while the bolt is still moving forward. Finally, the primer is ignited despite the weapon system being mounted on a low inertial airframe.

In addition, the weapon system utilizes feedback control of remote firing operations thereby allowing multiple shots, variable rate of fire and burst length. Further, having a sensor determine when the sear is engaged or not provides an advanced safety feature. A flywheel disconnect sear allows a small motor force to move a huge amount of trigger pull. In one case, the weapon system comprises a semi-automatic sear which allows for semi-automatic fire without computer control.

Figure 1:
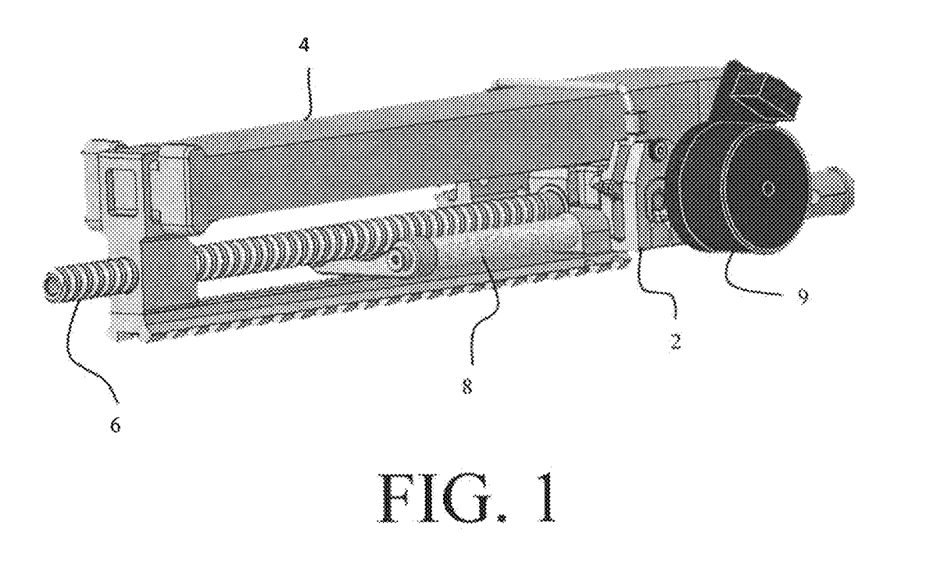
FIG. 1 is a perspective view of a weapon system for use on an unmanned aerial vehicle, according to an illustrative embodiment.

FIG. 1 is a perspective view of a weapon system for use on an unmanned aerial vehicle, according to an illustrative embodiment. The weapon system is configured to be integrated into an unmanned aerial vehicle and employs blowback operation to fire a high powered centerfire rifle cartridge. The weapon system further comprises a receiver structure 2, an ammunition magazine 4, a barrel 6, a weapon operating group 8 and a motor assembly 9.

The receiver structure 2 is mounted to a UAV airframe and provides a structure for mounting and housing other components. The ammunition magazine 4 sits on top of the receiver structure 2. The ammunition magazine 4 stores ammunition cartridges and feeds them to the barrel chamber 62. A longitudinal hole extending inward from the front of the receiver structure 2 receives and houses a rear portion of the barrel 6 from which a projectile is expelled during operation.

A weapon operating group 8 extends through the receiver. The weapon operating group 8 utilizes blowback operation to perform the functions of chambering a round 42, igniting the primer and ejecting the spent casing.

A motor assembly 9 of the weapon system controls the operation of the operating group 8. The DC motor 92 of the motor assembly 9 is mounted to the receiver structure 2 and the receiver structure 2 further houses additional portions of the motor assembly 9. The motor assembly 9 directly connects to a drive gear. Through a gear train, actuation of the motor lifts the sear 87 (against its return torsion spring 88), which holds the operating group 8 back when not firing. Intelligent motor commutation and burst control are achieved through an encoder 97 and software package.

Figure 2:
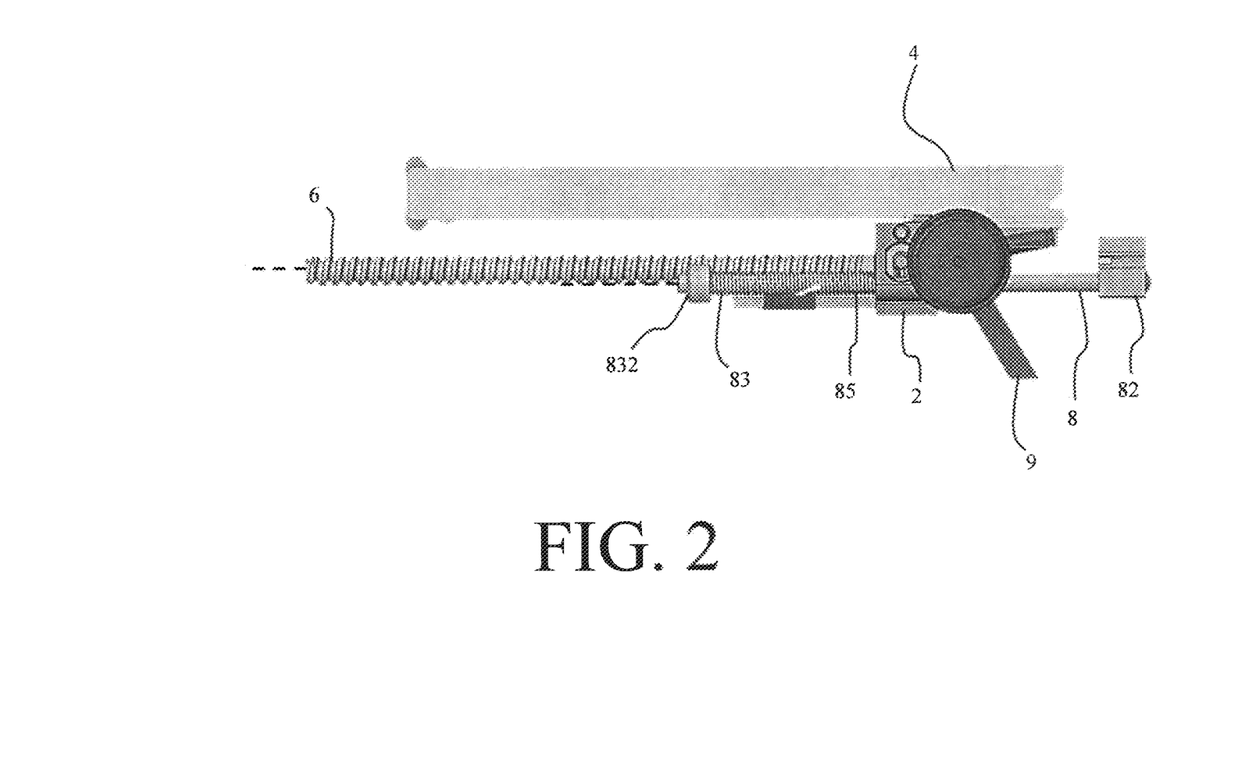
FIG. 2 is a right side plan view of the weapon system for use on an unmanned aerial vehicle, according to an illustrative embodiment.
Figure 3:
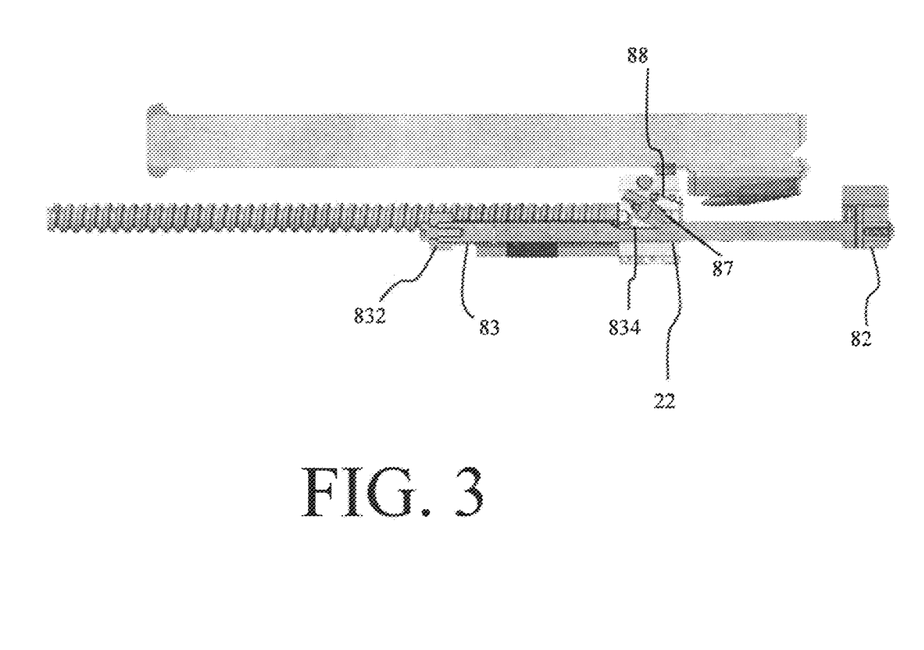
FIG. 3 is a cutaway side view of the weapon system for use on an unmanned aerial vehicle, according to an illustrative embodiment.

FIG. 2 is a right side plan view of the weapon system for use on an unmanned aerial vehicle, according to an illustrative embodiment. FIG. 3 is a cutaway side view of the weapon system for use on an unmanned aerial vehicle, according to an illustrative embodiment.

The weapon operating group 8 further comprises a bolt 82, a first operating rod 83 and a second operating rod, a corresponding first drive spring 85 and a second drive spring 86, a sear 87 and a sear torsion spring 88.

The first operating rod 83 and second operating rod sit slightly below and to each side of the barrel 6 and extend through guide holes 22 in the receiver structure 2. The first operating rod 83 and second operating rod are connected by a yoke 832 at a forward end of each. A drive spring 85, 86 surrounds each operating rod 83 between the yoke 832 at the forward end of the operating rod and the receiver structure 2. When the operating rod 83 is translated rearward toward the breech end of the weapon system, the drive springs 85, 86 are compressed between the yoke 832 and receiver structure 2 and provide a biasing force toward the muzzle end of the weapon system.

The bolt 82 is connected to the first operating rod 83 and second operating rod at the rear end of the operating rods 83. The bolt 82 further comprises an extractor 824 for extracting an ammunition cartridge from the ammunition magazine 4, an ejector 826 for ejecting spent cartridges from the weapon system and fixed firing pin 822 for igniting a primer within the ammunition round 42. The firing pin 822 is sized and dimensioned such that the firing pin 822 strikes a chambered ammunition cartridge while the bolt 82 is still traveling forward. A portion of the impulse energy from the struck cartridge is used to decelerate the forward movement of the bolt 82.

A lighter bolt is critical for enabling blowback operation on an unmanned aerial vehicle. Utilizing traditional designs for a weapon operating group 8 is not practical. For example, it is estimated that a three pound bolt would be required to accommodate FN 5.7 mm ammunition firing pulse in a traditional blowback configuration Several features of the weapon operating group 8 allow for blowback operation without a relatively massive bolt. .

First, the orientation of the operating rods 83 are offset from the centerline of the barrel 6 and of firing. The exact dimensions of the operating rods 83 and their displacement are derived to create a moment couple on the system. Essentially, the firing load is offset from the axis of translation. The offset force cause torque to be developed. This torqueing action induces higher than usual normal pressures (and friction) between the operating rods 83 and guide holes 22. This in turn, impedes the bolt's 82 rearward speed just enough that excess opening does not occur when the barrel 6 is still dangerously pressurized, leading to a case blowout.

Secondly, the operating rods reciprocate with the bolt 82 during operation. This is in contrast to traditional guide rods which are typically stationary in most weapons and add parasitic mass to the weapon system. Unlike traditional guide rods where this mass is usually wasted, in the present weapon system, the operating rods 83 add additional mass to the bolt 82, where it is useful in further slowing down the opening speed.

A third design feature is the use of advanced primer ignition. The firing pin 822 is rigidly attached to the bolt 82. Its protrusion is such that, when the cartridge is stripped from the magazine 4 and fed, the tip hits the primer, just as the bolt 82 is still moving forward. Since the bolt 82 is moving extremely fast at that point, some of the energy of the cartridge impulse must be exhausted to bring it to a halt. In conjunction with the geometry and the friction allotment of the bolt 82, this enables proper firing of the weapon.

Finally, the spring preload on the operating rods 83 are finely tuned to ignite the primer, despite the fact that the weapon is suspended in the air. This ensures that the action of the firing pin hitting the primer will set the cartridge off. In a traditional weapon system mounted on an airborne platform, too much energy may be "soaked up" by a low inertial air frame. As there is no rigid mount for the weapon system, the springs and a polymer buffer 24 are finely tuned so that the firing pin 822 always ignites the primer, while not hitting the primer with too much force thereby resulting in pierced primers.

To operate the weapon system, the weapon system is first placed in a cocked state. The weapon operating group 8 is pulled rearward during initial, manual charging, against drive springs 85, 86 until the weapon operating group 8 catches on the sear 87. A sear notch 834 in an operating rod 83 interacts with the sear 87 to catch and restrain the weapon operating group 8 in the cocked position. The sear 87 holds the operating group 8 in place under spring compression of the drive springs 85, 86. The sear 87 is spring loaded downward, or in the clockwise direction, by the sear torsion spring 88 as shown in FIG. 3.

Figure 4:
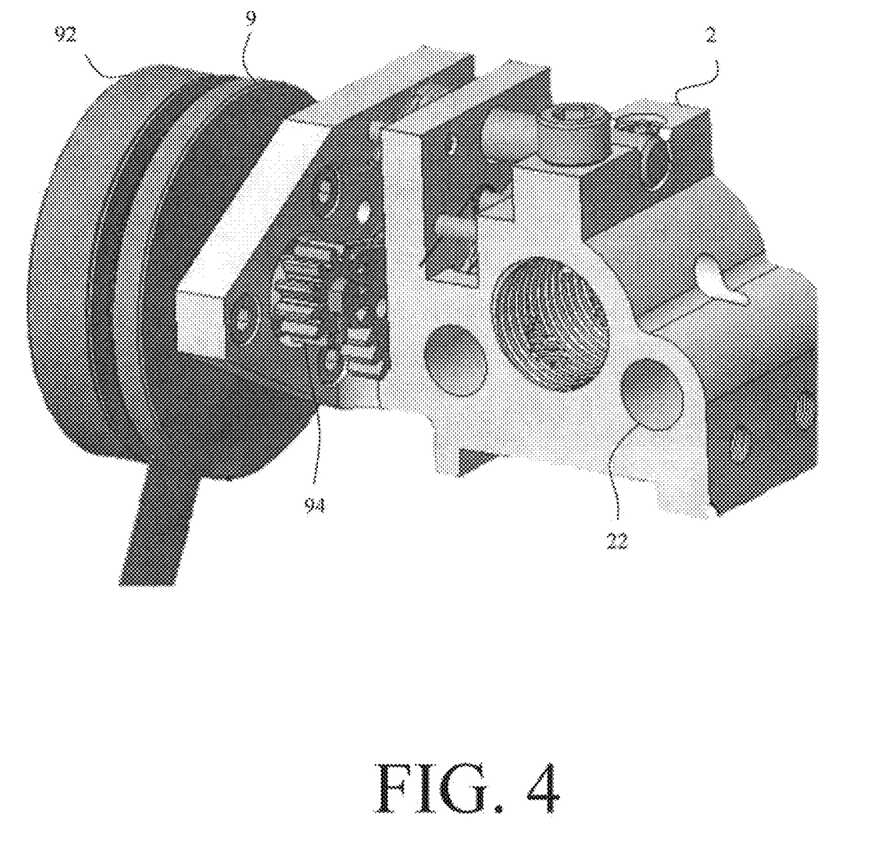
FIG. 4 is a perspective view of a motor assembly and receiver of the weapon system, according to an illustrative embodiment.
Figure 5:
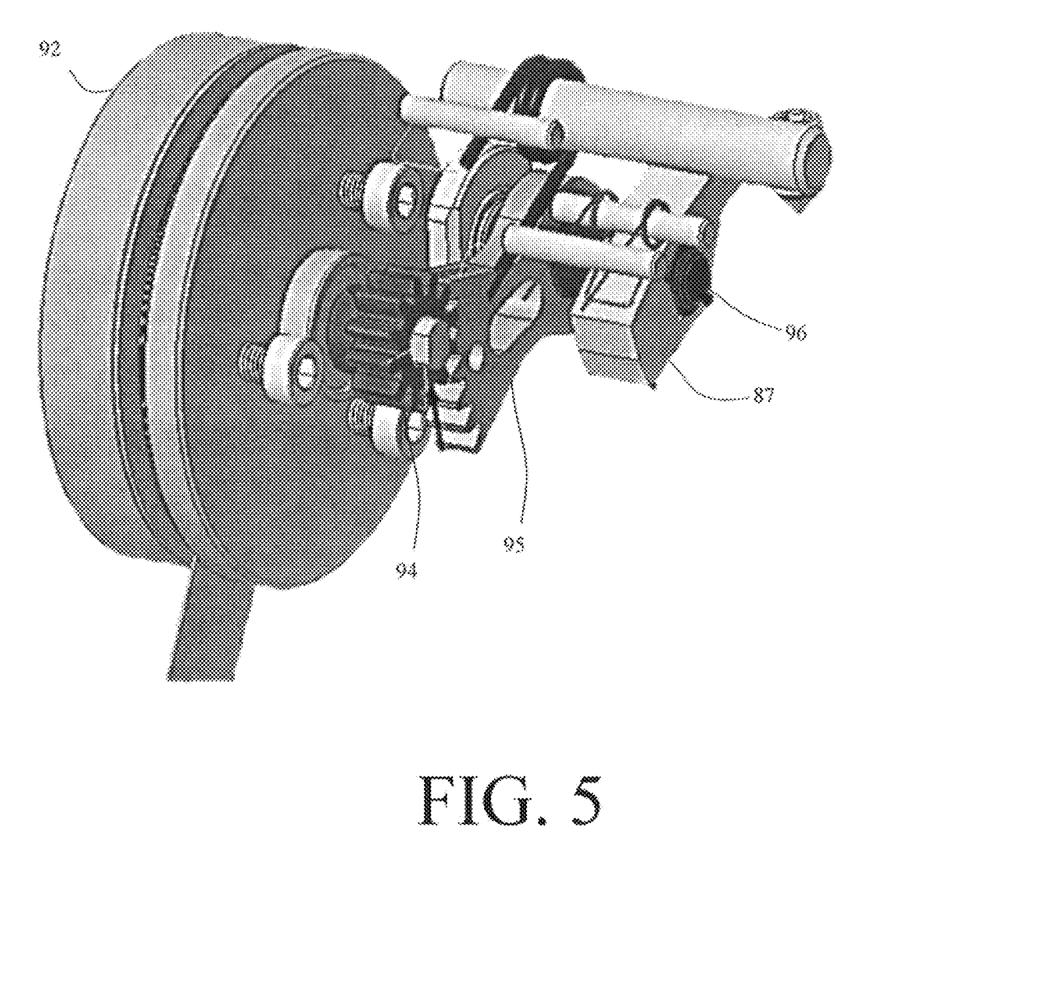
FIG. 5 is a perspective view of a motor assembly, according to an illustrative embodiment.

FIG. 4 is a perspective view of a motor assembly and receiver of the weapon system, according to an illustrative embodiment. FIG. 5 is a perspective view of a motor assembly, according to an illustrative embodiment. The motor assembly 9 remotely actuates the sear 87 and further comprises a direct current (DC) feedback controlled motor, a spur gear 94, a sector gear 95, a sear-to-gear-shaft 96 and an encoder 97.

In the embodiment shown, the motor is a DC motor. However, in other embodiments, the motor may be a remote servo. In this embodiment, the DC motor is a 10 in-oz, 48V, 50 mA motor.

The DC motor 92 is keyed to a small spur gear 94. The spur gear 94 meshes with a larger sector gear 95 to gain enough mechanical advantage to rotate the sear 87 out of sear notch 834 on the operating rod 83. The sear 87 and the sector gear 95 are keyed together by the sear-to-gear shaft 96 to rotate as one. Torsion springs 88 hold the sear 87 downward in the sear notch 834.

Figure 6:
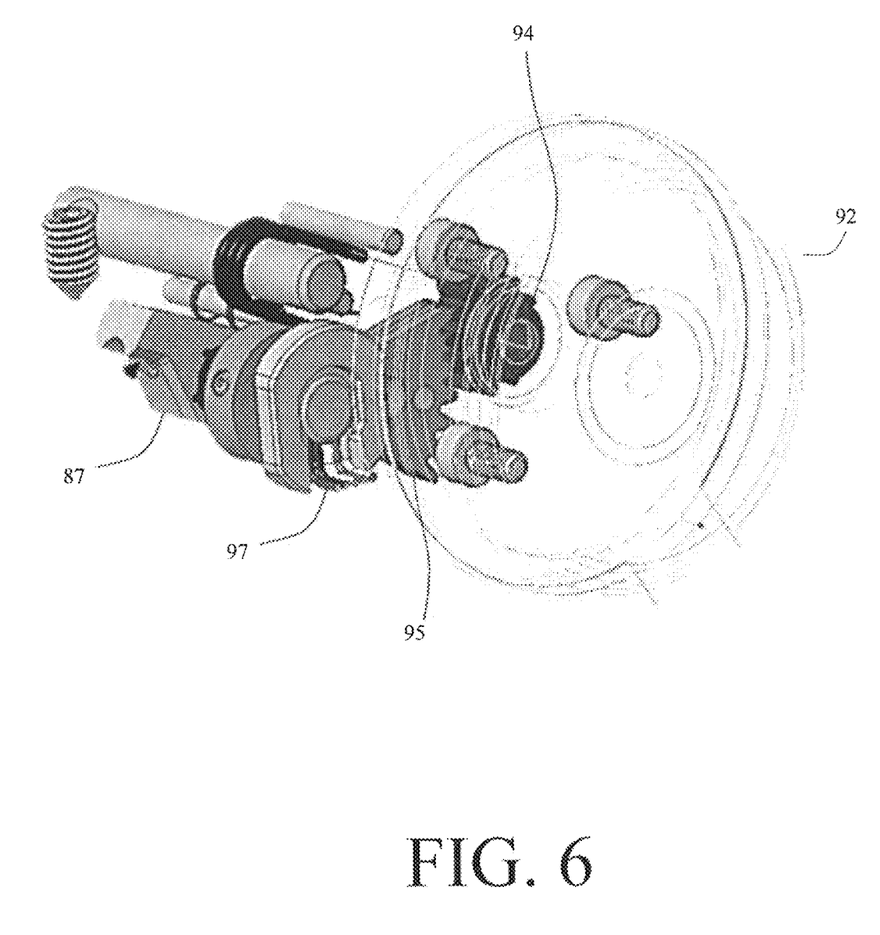
FIG. 6 is a perspective view of a motor assembly with the motor shown in transparency, according to an illustrative embodiment.

FIG. 6 is a perspective view of a motor assembly with the motor shown in transparency, according to an illustrative embodiment. The DC motor 92 is controlled by a motor driver and associated control software (Not shown). Information about the sear's angular displacement relative to the motor shaft position is provided by an encoder 97 which is coaxial with the sear 87. This information indicates whether the sear 87 is up, down or somewhere in between and is used by control software to control motor rotation. This in turn allows for the user to know when firing is enabled and allows for burst mode.

Figure 7:
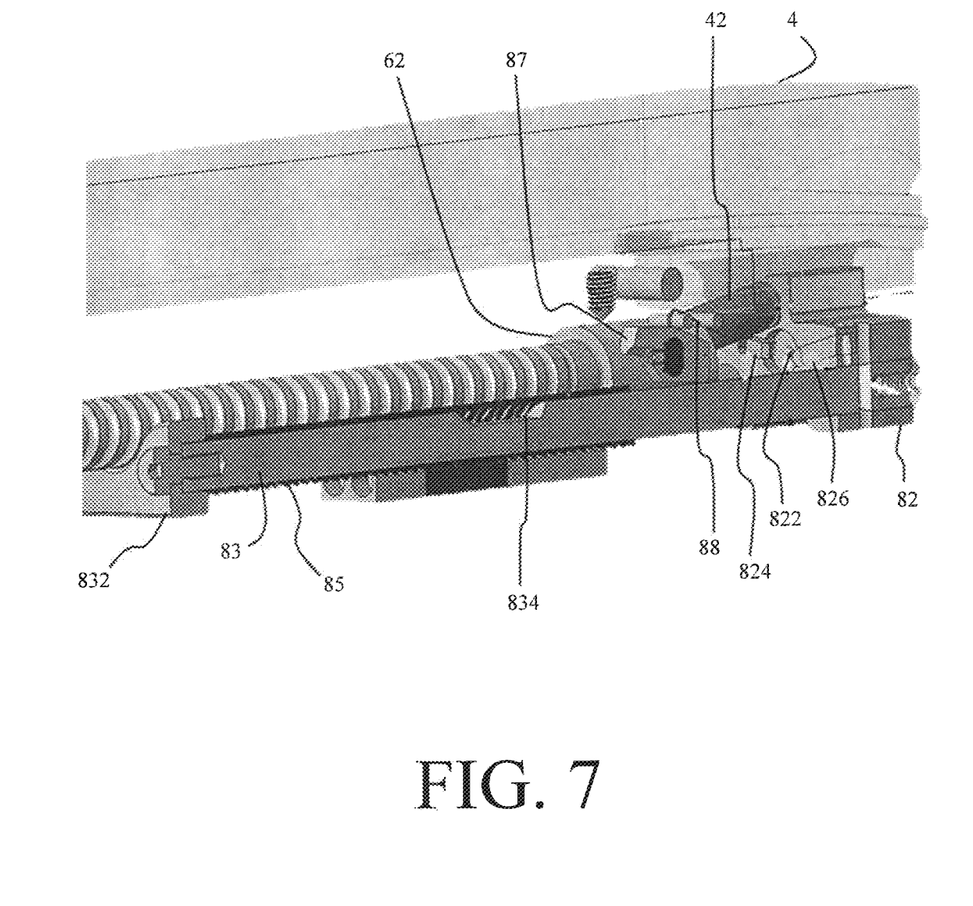
FIG. 7 is a close up view of an operating group of the weapon system in a cartridge feeding position, according to an illustrative embodiment.

FIG. 7 is a close up view of an operating group of the weapon system in a cartridge feeding position, according to an illustrative embodiment. When the sear 87 is disengaged by the motor assembly 9 from the notch 834 in the operating rod 83, the bolt 82 is urged forward by the drive springs 85, 86. The drive springs 85, 86 provide the energy to strip a cartridge from the magazine 4 and feed it into the barrel 6. A fixed firing pin 822 on the bolt face contacts the cartridge primer with enough energy to set off the round 42. The extractor 824 claw grips the rim of the case. An encoder 97 senses the position of the sear 87 and controls the motor to cut out once the sear 87 has reached maximum rotation.

Figure 8:
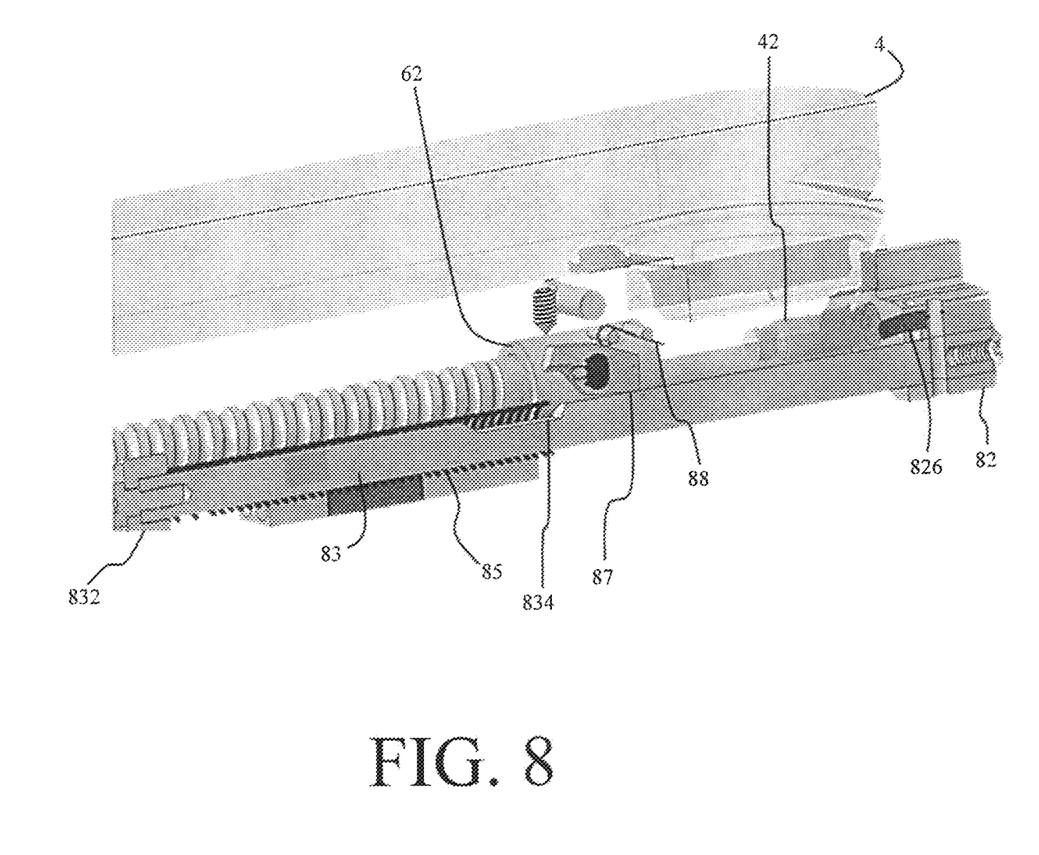
FIG. 8 is a close up view of an operating group of the weapon system in a cartridge ejection position, according to an illustrative embodiment.

FIG. 8 is a close up view of an operating group of the weapon system in a cartridge ejection position, according to an illustrative embodiment. The cartridge is fired by the bolts forward movement and the projectile is propelled down the barrel 6. The mass/inertia of the weapon operating group 8 contain the cartridge just long enough for pressures in the gun tube to drop to safe levels. The rearward energy of the fired cartridge start to push the operating group 8 backwards and against the force of the drive springs 85, 86. The extractor 824 claw, gripping the spent cartridge case, pulls it out of the barrel 6. The ejector 826 flipper then pushes the case clear of the weapon before it reaches full recoil.

Figure 9:
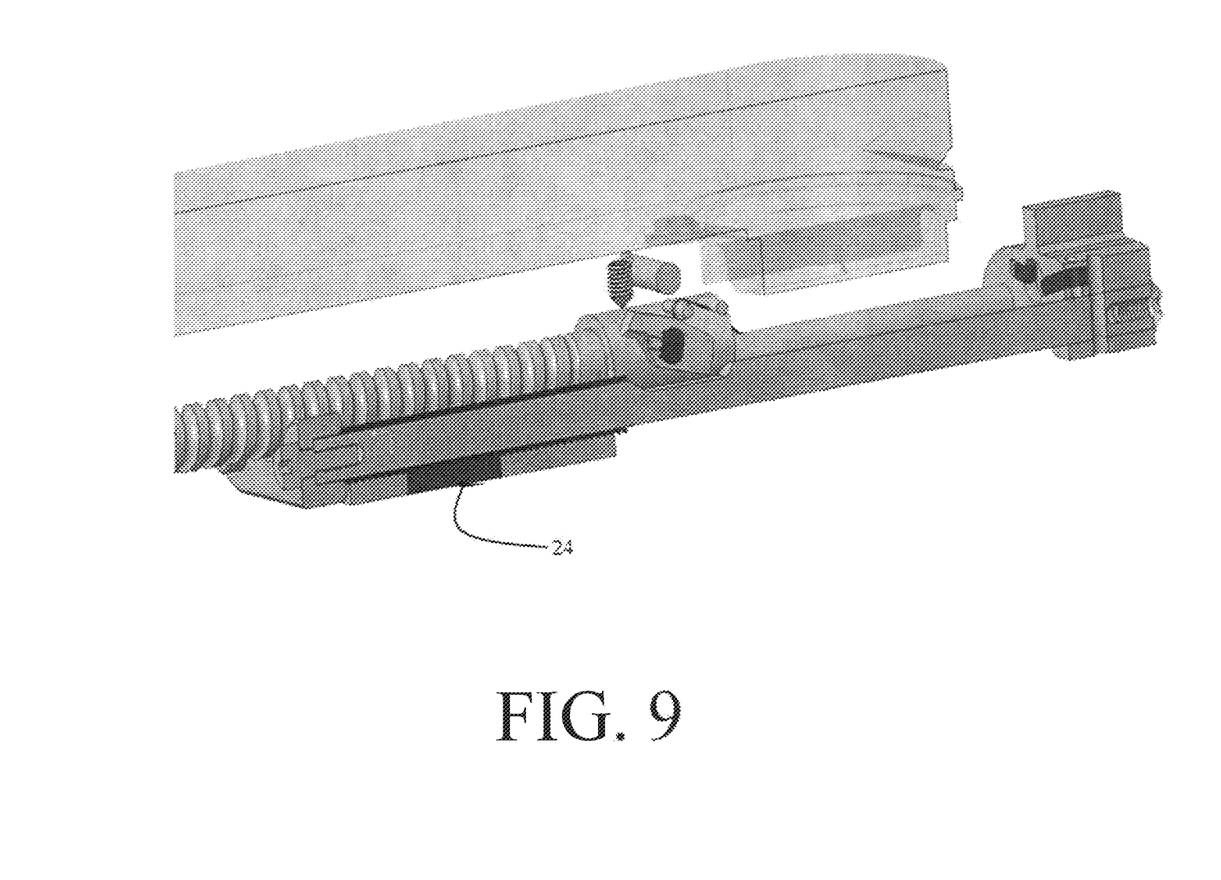
FIG. 9 is a close up view of the operating group of the weapon system, according to an illustrative embodiment.

FIG. 9 is a close up view of the operating group of the weapon system, according to an illustrative embodiment. While a large portion of the bolt's rearward energy is absorbed in the drive springs 85, 86, to arrest rearward motion fully, the fore-section of the operating group 8 strikes a polymer buffer 24 on the receiver structure 2. The polymer buffer 24 is part of an extension that protrudes forward from the receiver structure 2. As the buffer 24 compresses, the bolt 82 quickly slows down. This also allows more time for the sear springs 88 to re-engage the sear 87 into the notch 834.

In addition, as the weapon system may be employed on an aerial platform, the weapon system must also meet other requirements not of concern for ground systems. Namely, if the aerial system were to make a crash landing, it is imperative that the cocked weapon not fire, thereby possibly discharging into an unintended target. For this reason, the spring reload on the sear 87 is configured to be up to twenty times higher than the acceleration of gravity. For a small UAS, a tiny remote servo or DC motor must be made to shoulder this load. However, with the small amount of power available, no more than a few inch-ounces of torque can be provided to the trigger motor. For example, in the embodiment described above, the motor is a 10 in-oz., 48V, 50 mA DC motor.

Figure 10:
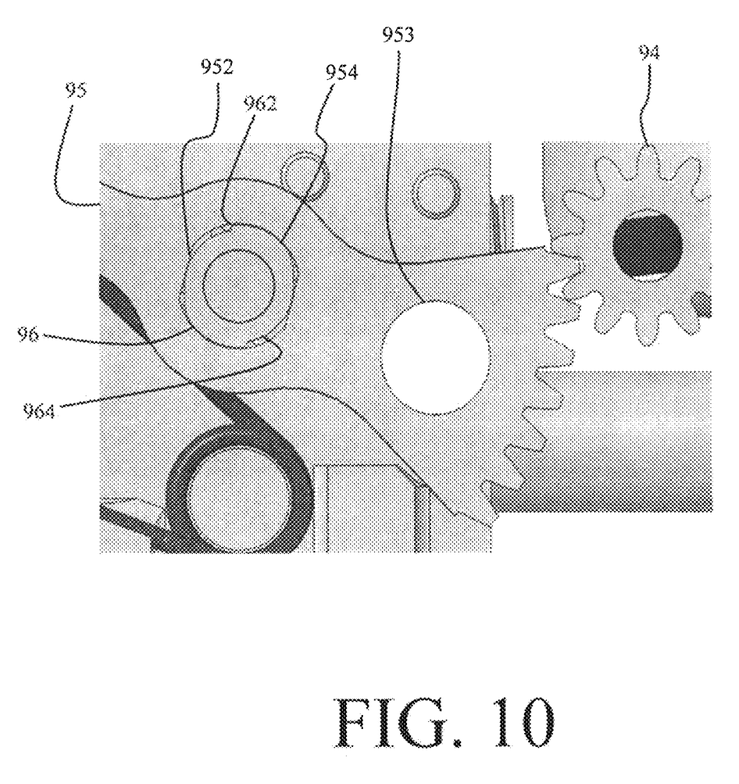
FIG. 10 shows a one-way flywheel disconnect, according to an illustrative embodiment.

FIG. 10 shows a one-way flywheel disconnect, according to an illustrative embodiment. To reliably pull the sear, several linkages and mechanisms are arranged. First, the motor is geared to the sear 87, transforming motor speed into higher torque. Additionally, there is a one-way flywheel disconnect. As shown in FIG. 10, the sector drive gear 95 is shown being driven by the spur gear 94. The sector gear 95 has two flats 952 cut into its center notch 954. These engage directly with corresponding flats 962 on the sear shaft 96. When the flats 952, 962 are aligned, the sear 87 and the sector gear 95 move as one, and the sear 87 is pulled out of the sear notch 834 in the operating rod 83. The flats 952, 962 are not initially in alignment. A cutout 964 in the sear shaft 96 enables a good degree of rotation of the sector gear before it interferes with the flats 962. For example, in one embodiment, the sear shaft may rotate ten to twenty degrees before it interferes with the flats thereby building up rotational inertia before contacting the sear with an impact load to pop it open. The sector gear 95 is also weighted with lead or other mass 953 relatively far from its center of rotation at the sear shaft center notch 954. In operation, the spur gear 94 accelerates the free-wheeling sector gear 95, storing rotational momentum in the offset mass 953. As the sector gear 95 accelerates to a necessary speed, the flats 952 on the sector gear 95 contact the flats 962 on the sear shaft 96. The momentum, plus the torque transmitted via the gear to the linkage, is enough to overcome the significant biasing force on the sear 97.

Figure 11:
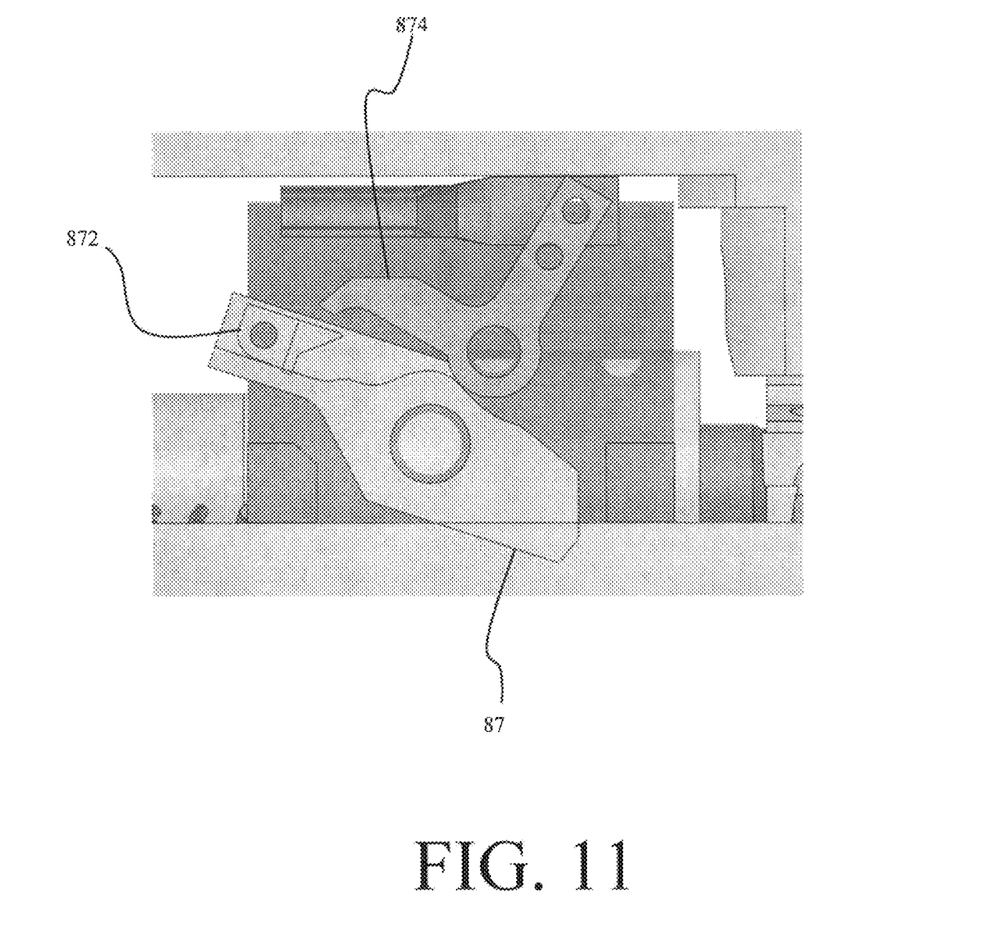
FIG. 11 shows a sear trigger, according to an illustrative embodiment.

FIG. 11 shows a sear, according to an illustrative embodiment. In another embodiment, the sear 97 enables a semi-automatic mode of fire only but without the need for computer control. An L-shaped dog leg 874 is positioned above and in contact with the sear 97. When the L-shaped dog leg 874 is pulled counter-clockwise, the dog leg 874 contacts a "flipper" 872 attached to the sear 87. When pulled a pre-determined rotation counter-clockwise, the dog leg 874 pushes the flipper 872 and sear 87 to rotate out of the sear notch 834 thereby firing the weapon. As the dog leg continues to over-rotate, it slips under the flipper 872. The flipper 872 is spring-loaded clockwise. When the dog leg 874 returns to its start position, it slips under the flipper 872 and rests on top again, allowing just one shot per pull.

While the invention has been described with reference to certain embodiments, numerous changes, alterations and modifications to the described embodiments are possible without departing from the spirit and scope of the invention as defined in the appended claims, and equivalents thereof.

What is claimed is:

1. A remote weapon system for use on a vehicle comprising:
    a receiver structure for mounting the weapon system;
    an ammunition magazine positioned on top of the receiver structure;
    a barrel inserted into the receiver structure and further comprising a longitudinal axis; and
    a weapon operating group utilizing blowback operation housed within the receiver structure and further comprising
        a bolt,
        an operating rod further comprising an axis of translation which is offset from the longitudinal axis of the barrel thereby creating a moment couple on the system, said operating rod for pulling the bolt against a drive spring by translating through a corresponding hole in the receiver structure,
        a drive spring, and
        a sear for controllably restraining the bolt against the drive spring; and
    a motor assembly mounted to the receiver structure for controlling the operation of the operating group by lifting the sear against a sear torsion spring, said motor assembly further comprising
        a direct current motor mechanically connected to the sear through a gear train, said gear train comprising a one way flywheel disconnect to increase the torque of the direct current motor and overcome the force of the torsion spring.

2. The remote weapon system of claim 1 wherein:
    the gear train further comprises a drive gear connected to the direct current motor, a sector gear driven by the drive gear and further comprising a center notch defining a first gear flat and a second gear flat, and a shaft extending through the central hole of the sector gear and connecting the sector gear to the sear, said shaft comprising a first shaft flat corresponding to the first gear flat and a second shaft flat corresponding to the second gear flat.

3. The remote weapon system of claim 2 wherein the first gear flat, second gear flat, first shaft flat and second shaft flat are positioned such that the sector gear rotates freely for a predetermined degree of rotation before impacting the shaft.

4. The remote weapon system of claim 3 wherein the predetermined degree of rotation is in a range of ten to twenty degrees.

5. The remote weapon system of claim 2 wherein the sector gear further comprises an offset mass for storing rotational momentum.

6. The remote weapon system of claim 1 wherein the sear torsion spring biases the sear with a force twenty times the force of gravity.

7. The remote weapon system of claim 1 wherein the direct current motor provides a torque of 10 inch-ounces.

8. The weapon system of claim 1 wherein the weapon system is configured for firing high powered centerfire rifle cartridges.

* * * * *